United States Patent
Ravishankar

(10) Patent No.: US 11,272,373 B2
(45) Date of Patent: Mar. 8, 2022

(54) SYSTEM AND METHODS FOR SPECTRUM SHARING BETWEEN SATELLITE AND TERRESTRIAL COMMUNICATION SYSTEMS

(71) Applicant: HUGHES NETWORK SYSTEMS, LLC, Germantown, MD (US)

(72) Inventor: Channasandra Ravishankar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/237,662

(22) Filed: Dec. 31, 2018

(65) Prior Publication Data
US 2019/0239082 A1   Aug. 1, 2019

Related U.S. Application Data

(60) Provisional application No. 62/622,803, filed on Jan. 26, 2018.

(51) Int. Cl.
| | |
|---|---|
| *H04W 16/14* | (2009.01) |
| *H04W 24/02* | (2009.01) |
| *H04W 16/10* | (2009.01) |
| *H04W 48/16* | (2009.01) |
| *H04W 72/08* | (2009.01) |
| *H04W 84/06* | (2009.01) |
| *H04B 7/185* | (2006.01) |
| *H04W 72/04* | (2009.01) |

(52) U.S. Cl.
CPC ........... *H04W 16/14* (2013.01); *H04W 16/10* (2013.01); *H04W 24/02* (2013.01); *H04W 48/16* (2013.01); *H04W 72/082* (2013.01); *H04B 7/1853* (2013.01); *H04W 72/0453* (2013.01); *H04W 84/06* (2013.01)

(58) Field of Classification Search
CPC ..... H04W 16/14; H04W 48/16; H04W 16/10; H04W 24/02; H04W 84/06
See application file for complete search history.

(56) References Cited

U.S. PATENT DOCUMENTS

| | | | |
|---|---|---|---|
| 10,390,233 B2* | 8/2019 | Van Phan | H04W 16/16 |
| 2002/0041575 A1* | 4/2002 | Karabinis | H04B 7/18539 370/319 |
| 2003/0054760 A1* | 3/2003 | Karabinis | H04B 7/1853 455/12.1 |
| 2004/0072539 A1* | 4/2004 | Monte | H04B 7/18563 455/13.4 |
| 2010/0029262 A1* | 2/2010 | Wang | H04J 11/004 455/423 |
| 2016/0006500 A1* | 1/2016 | Radpour | H04B 7/18539 370/319 |

(Continued)

*Primary Examiner* — Mazda Sabouri
(74) *Attorney, Agent, or Firm* — Jones Robb, PLLC

(57) ABSTRACT

A method and system for sharing frequency spectrum with multiple networks includes selecting a first geographical coverage area served by a first base station associated with a first network. The first base station is configured to utilize a predetermined frequency spectrum. A second base station, associated with a different network, that is operating within the first geographical coverage area is identified. Frequency resources from the predetermined are subsequently allocated to the second base station.

23 Claims, 12 Drawing Sheets

(56) References Cited

U.S. PATENT DOCUMENTS

| | | | | |
|---|---|---|---|---|
| 2016/0028472 A1* | 1/2016 | Valencia | ............ | H04B 7/18513 |
| | | | | 370/316 |
| 2016/0345189 A1* | 11/2016 | Miyagawa | ............ | H04W 16/14 |
| 2017/0048722 A1* | 2/2017 | Van Phan | ............. | H04W 16/16 |
| 2017/0086077 A1* | 3/2017 | Teng | ..................... | H04W 28/08 |
| 2018/0183511 A1* | 6/2018 | Oga | ................... | H04B 7/18513 |
| 2019/0158241 A1* | 5/2019 | Behravan | .............. | H04L 5/0044 |

* cited by examiner

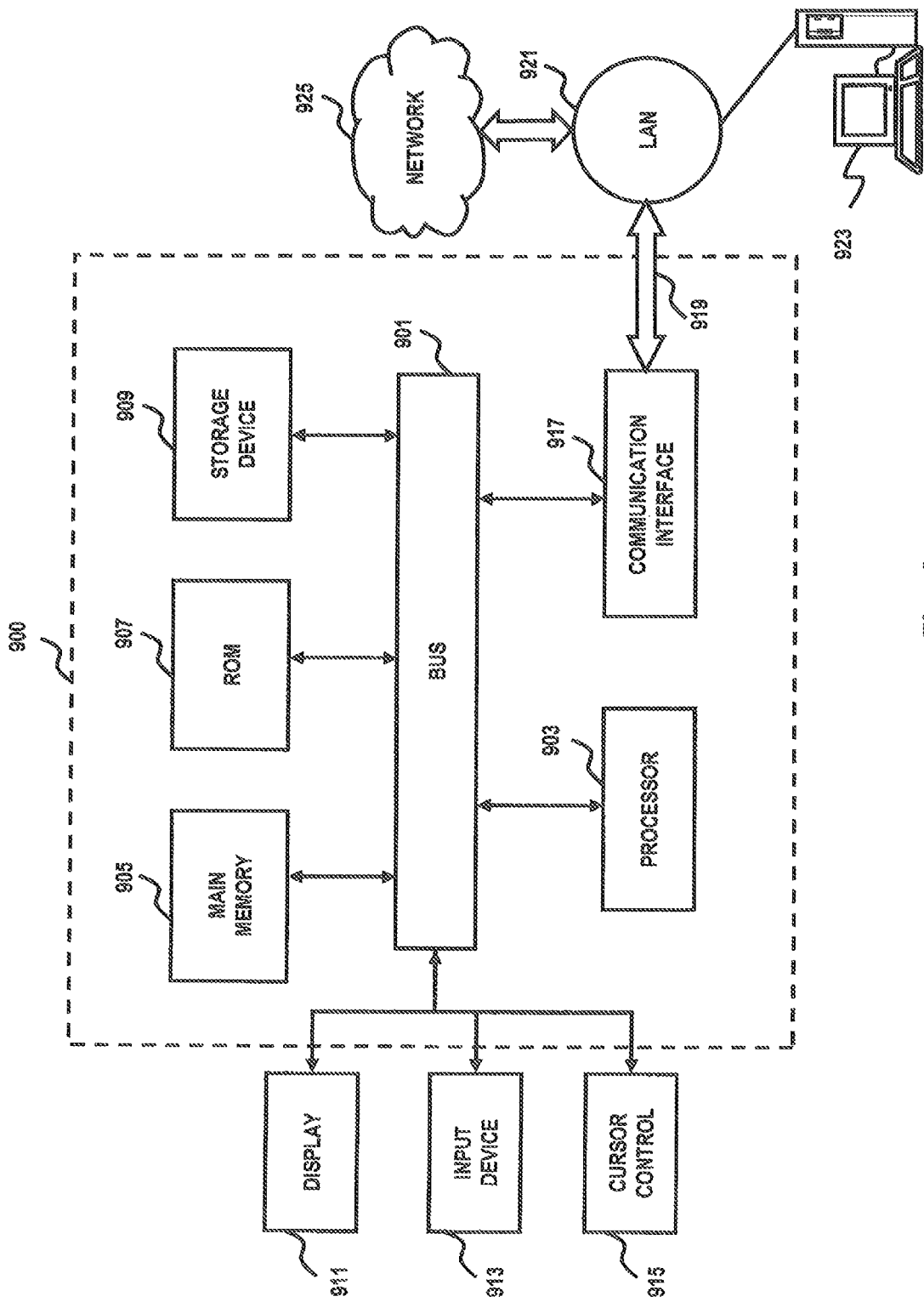

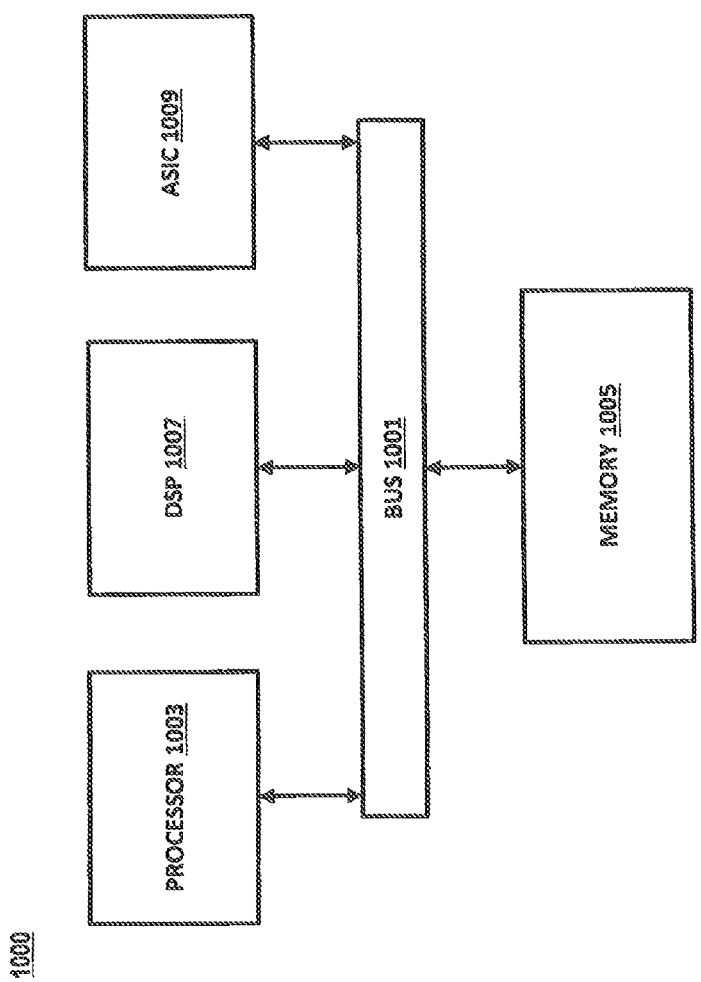

SYSTEM AND METHODS FOR SPECTRUM SHARING BETWEEN SATELLITE AND TERRESTRIAL COMMUNICATION SYSTEMS

BACKGROUND INFORMATION

With fast growing technology in communication systems, there is an increasing need for integrating multiple communication systems, such as satellite and terrestrial networks. Generally, satellite and terrestrial communication networks utilize different specific frequency bands. However, inefficiencies exist if a frequency spectrum allocated to one communication system is shared with another communication system. For example, a 20 MHz frequency band allocated to a satellite communication system (e.g. 1990 MHz to 2010 MHz for return link and 2180 MHz to 2200 MHz for forward link), when shared with a terrestrial communication system (such as a long-term evolution LTE network), there can be interference from multiple sources to the satellite. First, terrestrial uplink transmissions transmitting in the 20 MHz spectrum in the 1990-2010 MHz band will interfere with satellite terminal transmission. Secondly, terrestrial base stations that utilize the satellite return link frequencies in the terrestrial downlink will cause interference to satellite user terminal's transmissions. Further, return link interference may be experienced by many satellite beams, not just the ones where the terrestrial base stations are located.

Existing solutions to these problems are ineffective. For example, beam coefficients in the satellite communication systems may be designed so that interference is suppressed in the direction of terrestrial hotspots, i.e. location of terrestrial base stations and/or interfering coverage areas. Thus, nulls are formed in the terrestrial hotspots so that the interference from/to these locations are minimized to the satellite beam. However, the growing numbers of terrestrial base stations makes the task of designing beams in the satellite communication system challenging, if not impossible, since forming nulls in too many locations can lead to beam response distortions that can result in significant degradations in carrier-to-interference ratio (C/I).

BRIEF SUMMARY

Methods and systems are described for sharing resources of a frequency band with multiple wireless networks. According to an embodiment, the method includes: selecting a first geographical coverage area served by a first base station associated with a first network, wherein the first base station is configured to utilize a predetermined frequency spectrum, the predetermined frequency spectrum being a contiguous set of frequencies owned by the first network; identifying a second base station operating within the first geographical coverage area, the second base station being associated with a second network; allocating a contiguous portion of the predetermined frequency spectrum and resources associated therewith for exclusive use by the second base station; allocating a remaining portion of the predetermined frequency spectrum adjacent to the contiguous portion and resources associated therewith towards the first base station; determining, by the first base station, usage requirements of the first base station and the second base station; and dynamically adjusting the contiguous portion of the predetermined frequency spectrum and the remaining portion of the predetermined frequency spectrum based, at least in part, on the determined usage requirements, wherein a frequency separation is maintained between the first network and the second network, wherein the contiguous portion of the predetermined frequency spectrum allocated towards the second base station comprises a middle portion of the predetermined frequency spectrum, and the remaining portion of the predetermined frequency spectrum allocated towards the first base station comprises one or more edge portions of the predetermined frequency spectrum, wherein the one or more edge portions of the predetermined frequency spectrum comprise one or more guard bands, and wherein the first network comprises a satellite network, and the second network comprises a terrestrial network.

According to another embodiment, a system includes: a first base station associated with a first network and configured to utilize a predetermined frequency spectrum, the predetermined frequency spectrum being a contiguous set of frequencies owned by the first network; and one or more processors coupled to the first base station, the one or more processors being configured to: select a first geographical coverage area served by the first base station; identify a second base station operating within the first geographical coverage area, the second base station being associated with a second network; allocate a contiguous portion of the predetermined frequency spectrum and resources associated therewith for exclusive use by the second base station, allocate a remaining portion of the predetermined frequency spectrum adjacent to the contiguous portion and resources associated therewith towards the first base station; determine usage requirements of the first base station and the second base station; and dynamically adjust the contiguous portion of the predetermined frequency spectrum and the remaining portion of the predetermined frequency spectrum based, at least in part, on the determined usage requirements, wherein a frequency separation is maintained between the first network and the second network, wherein the contiguous portion of the predetermined frequency spectrum allocated towards the second base station comprises a middle portion of the predetermined frequency spectrum, and the remaining portion of the predetermined frequency spectrum allocated towards the first base station comprises one or more edge portions of the predetermined frequency spectrum, wherein the one or more edge portions of the predetermined frequency spectrum comprise one or more guard bands, and wherein the first network comprises a satellite network, and the second network comprises a terrestrial network.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 9 is a diagram of a computer system that can be used to implement various exemplary embodiments; and FIG. 10 is a diagram of a chip set that can be used to implement various exemplary embodiments.

DETAILED DESCRIPTION

Exemplary embodiments herein disclose methods and systems for allocating resources within a frequency spectrum to at least two wireless communication networks. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
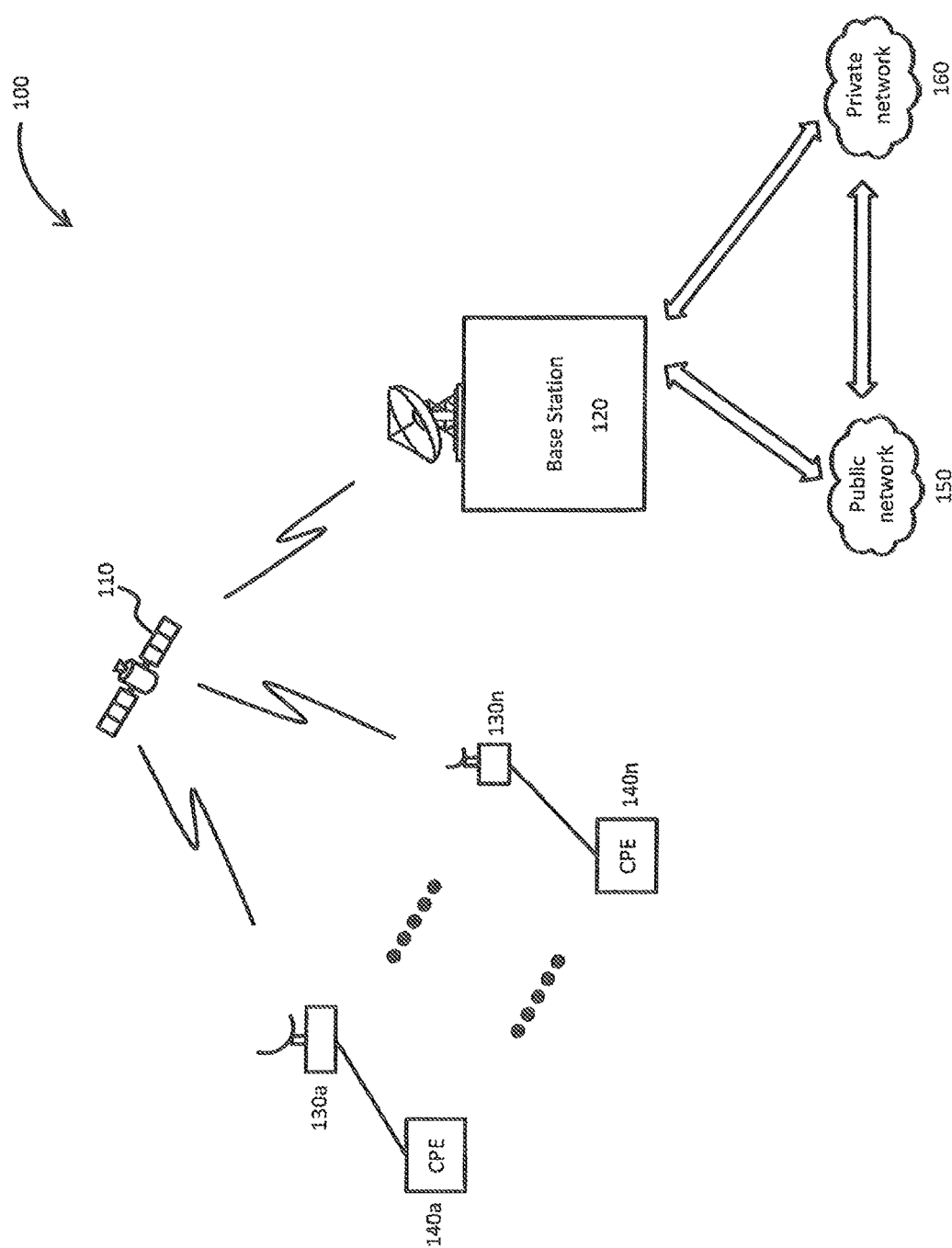
FIG. 1 is a diagram of a conventional satellite communication system capable of providing voice and data services.

FIG. 1 is a diagram of a conventional satellite communication system 100. The system 100 includes a satellite 110 that supports communications among a number of base stations 120 (only one shown) and multiple satellite terminals 130a-130n. Each satellite terminal (or terminal) 130 can be configured for relaying traffic between its customer premise equipment (CPEs) 140a-140n, a public network 150 such as the Internet, and/or from its private network 160. For example, base station 120 can be configured to route traffic across the public network 150 and private network 160 as appropriate, via any combination of gateways and/or other network nodes (not shown). Base station 120 can further be configured to route traffic from the public network 150 and private network 160 to the appropriate terminal 130 via satellite 110. The terminal 130 then routes the traffic to the appropriate customer premise equipment (CPE) 140. Terminal 130 can comprise any type of terminal, including terminals having small or medium antennae that are fixed, directional, or omnidirectional.

The base station 120 and terminal 130 communicate with each other through beams, where the base station 120 transmits signals to terminal 130 in a forward link direction, and the terminal 130 transmits signals to the base station 120 in the return link direction. Each beam utilizes one or more carriers corresponding to a contiguous span of a frequency band or spectrum. For the purposes of this disclosure a "frequency band" or "frequency spectrum" comprises a contiguous set of frequencies that satellite communication system 100 is licensed to utilize. Further, although FIG. 1 only illustrates one terminal and one base station, it should be noted that different systems can include additional terminals of various types, and additional base stations. For example, additional base stations additional may be provided at different points within the system 100. Accordingly, the communication system 100 illustrated in FIG. 1 is only intended to be illustrative, and in no way restrictive.

Figure 2:
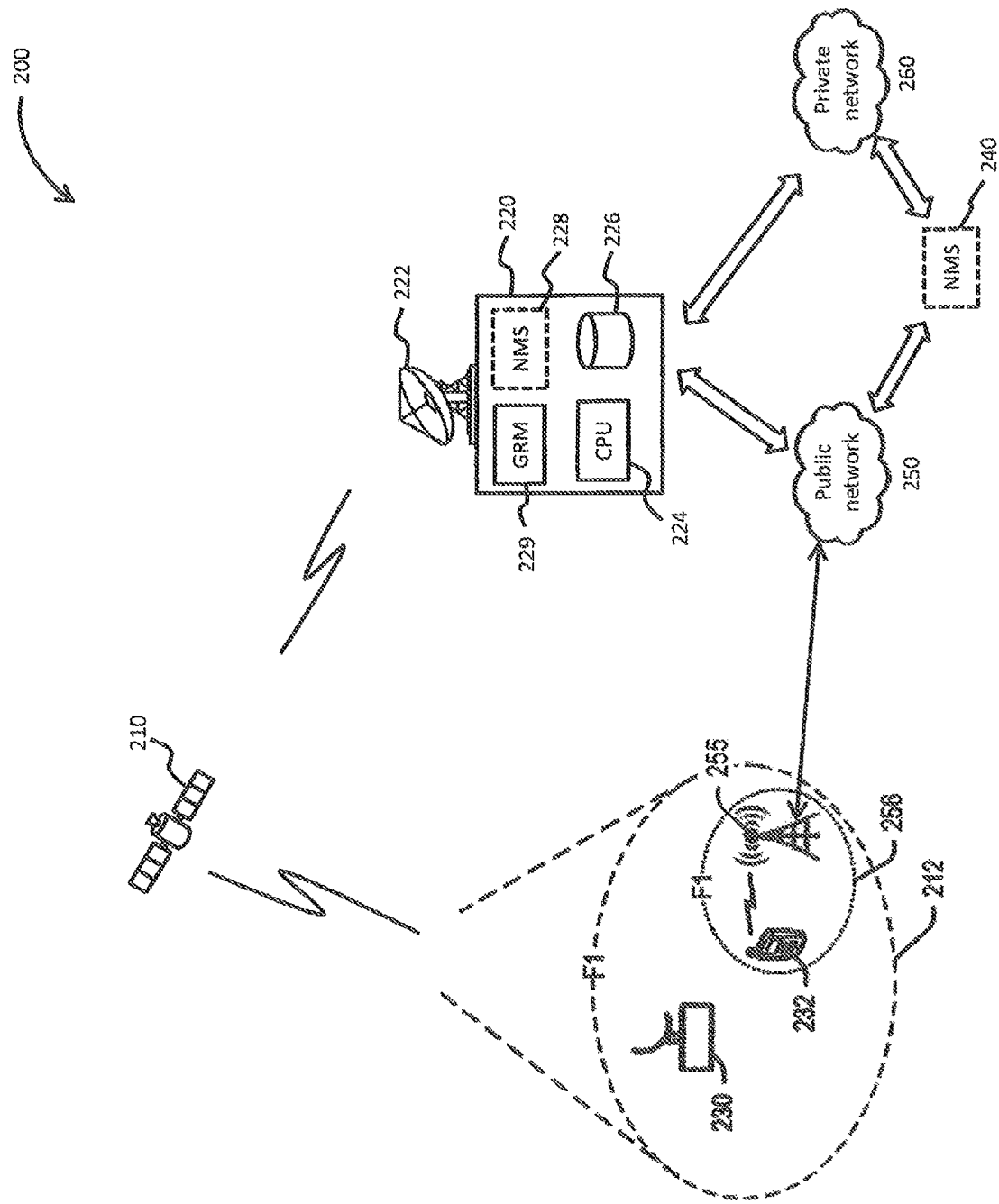
FIG. 2 is a diagram of a satellite communication system capable of sharing resources of a frequency band with multiple wireless networks.

FIG. 2 is a diagram of a satellite communication system 200 capable of sharing resources of a frequency band with multiple wireless networks. The system 200 includes a satellite 210 associated with a satellite network and a satellite base station 220 that is associated with the satellite network. The satellite base station 220 facilitates communication between terminal 231 and public network 250 and private network 260. According to the illustrated embodiment, the satellite base station 220 also communicates with a terrestrial base station 255 that is associated with a terrestrial network and facilitates communication between terminal 232 and public network 250. Although not illustrated in FIG. 2, the terrestrial base station 255 can also be configured to communicate with one or more private networks.

The satellite base station 220 and terminal 231 communicate with each other through coverage beams 212 (or beams) that encompass specific geographical areas. According to at least one embodiment, all beams defining the satellite coverage area can be identically sized. According to other embodiments, however, the beams may be sized differently depending on region (e.g., urban, rural, ocean, etc.). The satellite base station 220 is configured to transmit signals to terminal 231 in a forward link direction, and the terminal 231 is configured to transmit signals to the satellite base station 220 in the return link direction. Each beam 212 utilizes one or more carriers corresponding to a contiguous span of a frequency band or spectrum. According to the illustrated embodiment, beam 212 utilizes frequency band F1.

Public network 250 and private network 260 can be any wired and/or wireless communication networks, and can comprise processing nodes, routers, gateways, and physical and/or wireless data links for carrying data among various network elements, including combinations thereof, and can include a local area network a wide area network, and an internetwork (including the Internet). Public network 250 and private network 260 can be capable of carrying data, for example, to support voice, push-to-talk, broadcast video, and data communications by base stations 220, 255, NMS 240, and/or wireless terminals 231, 232. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by public network 250 and private network 260 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication links between public network 250, private network 260 and other components of system 200 can use various communication protocols such as Internet, Internet protocol (IP), local-area network (LAN), optical networking, hybrid fiber coax (HFC), telephony, T1, or some other communication format—including combinations, improvements, or variations thereof. System 200 can also comprise additional base stations, controller nodes, telephony switches, internet routers, network gateways, computer systems, communication links, or some other type of communication equipment, and combinations thereof.

Further, in order to exchange information with terminal 231, the satellite base station 220 can include a transceiver 222 which transmits/receives information to/from the satellite 210. The terminal 231 can communicate with the satellite base station 220 along a bent pipe path facilitated by the satellite 210 and transceiver 222. According to at least one embodiment, the satellite base station 220 can include, in part, a processing unit 224 (or computer, CPU, etc.), and a data storage unit 226. Alternatively, the satellite base station 220 can include multiple processing units 224 and multiple data storage units 226 in order to accommodate the needs of a particular system implementation. The data storage units 226 can be used to store and provide various access to information pertaining, in part, to operations in the satellite communication system 200. The processing unit 224 can be configured, in part, to perform various tasks related to managing communications with terminal 231 public network 250, and private network 260.

According to one or more embodiments, the satellite base station 220 can include a network management system (NMS) 228 configured to manage and maintain the operational status of various components of the satellite base station 220 and its associated terminals 231. As such, the NMS 228 can access the data storage unit 226 to store and retrieve such information. The NMS 228 can be further configured to manage and maintain operational information related to the terrestrial base station 255. While FIG. 2 illustrates the NMS 228 as being located within the satellite base station 220, various implementations can provide for an external NMS 240 in place of, or in addition to NMS 228. For example, external NMS 240 can be configured to operate in a redundancy mode in order to prevent data loss or reduce downtime resulting from system failures. The external NMS 240 can also be configured to operate in conjunction with NMS 228 in order to balance operational workload and/or minimize delays. Furthermore, the processing unit 224 can be configured to perform on or more functions of NMS 228 and/or NMS 240.

According to various embodiments, the satellite base station 220 can be configured to share resources from frequency band F1 with components of a terrestrial network that includes, for example, terrestrial base station 255, which may comprise a standard cellular radio base station, such as a NodeB device, enhanced eNodeB device associated with an LTE network, gNodeB device associated with a 5G network, etc. Terrestrial base station 255 is illustrated as being located inside geographical area encompassed by beam 212, and having its own coverage area 256. Further, terrestrial base station 255 may be capable of deploying a coverage area 256 utilizing frequency band F1, or a subset thereof. For example, the satellite base station 220 can also include a Global Resource Manager (GRM) 229 configured to coordinate and prioritize the resource requirements by both terrestrial and satellite networks. GRM 229 communicates with both networks and dynamically allocate resources among them to meet their requirements while minimizing potential interference between the two networks. For example, the GRM 229 can be configured to dynamically allocate the necessary resources to facilitate the use of some or all of frequency band F1 depending various factors such as active satellite terminals 231, current bandwidth allocation to active satellite terminals, etc. According to an embodiment, the GRM 229 can be configured to allow dynamic power adjustments at terrestrial base station 255 in order to control interference levels and improve the manner in which the frequency spectrum is shared. Depending on the specific implementation, the processing unit 224 can be configured to perform one or more functions of the GRM 229.

According to one or more embodiments, the satellite base station 220 can be configured to identify the terrestrial base station 255 operating within the geographical coverage area of beam 212, and allocating resources within the frequency spectrum towards the terrestrial base station 255. Similar operations may be performed for additional geographical coverage areas of different beams (not shown) served by base station 220. For example, the satellite base station 220 can be configured to determine whether or not the geographical location of a terrestrial base station (such as terrestrial base station 255) is within a geographical coverage area served by one of the other beams.

According to various embodiments, resources within the frequency spectrum F1 are allocated between the satellite terminals 231 and the terrestrial base station 255 such that both can operate using the same frequency spectrum F1 without causing interference to each others' signals. For example, an amount of the resources allocated towards the terrestrial base station 255 may be based on its geographical location within the geographical coverage area of beam 212. Alternatively, or additionally, the amount of resources allocated towards the terrestrial base station 255 may be based on a or a size of the overlap region, as further described with reference to FIGS. 5-6.

According to an embodiment, the amount of the resources can be allocated towards the terrestrial base station 255 based on an interference reported within the geographical coverage area of beam 212. For example, satellite terminals 231 operating in the vicinity of terrestrial base station 255 or within an overlapping coverage area, can detect the interference and transmit such information to the base station 220. According to other embodiments, the amount of resources within the frequency spectrum F1 allocated towards the terrestrial base station 255 can be based on usage requirements of the satellite terminals 231 within beam 231 and terrestrial base station 255. According to further embodiments, the satellite base station 220 can be further configured to determine an increase in the usage requirement of the satellite terminals 230 in coverage beam 212, and instruct the terrestrial base station 255 to mute a portion of its allocated resources based on the increase, as further described with respect to FIGS. 7A-7B.

According to one or more embodiments, the resources allocated towards the terrestrial base station 255 can comprise a middle portion of the frequency spectrum F1, and the remaining resources allocated towards the satellite access node 220 can comprise one or more edge portions of the frequency spectrum F1. In an exemplary embodiment, the one or more edge portions of the frequency spectrum F1 comprise one or more guard bands. Thus, the one or more guard bands can be allocated towards, or can be part of the resources allocated for, satellite communications, while the center portion can be allocated towards terrestrial communications. According to an embodiment, the GRM 229 can be configured to determine an increase in the usage requirement of satellite terminals 230 within beam 212, and instruct the satellite base station 220 to increase its resource utilization starting from the edge portions of the frequency band F1. Similarly, the GMR 229 may be configured to determine an increase in the usage requirement of the terrestrial base station 255 and instruct the terrestrial base station 255 to increase its resource utilization starting from the center of the frequency band F1.

Figure 3:
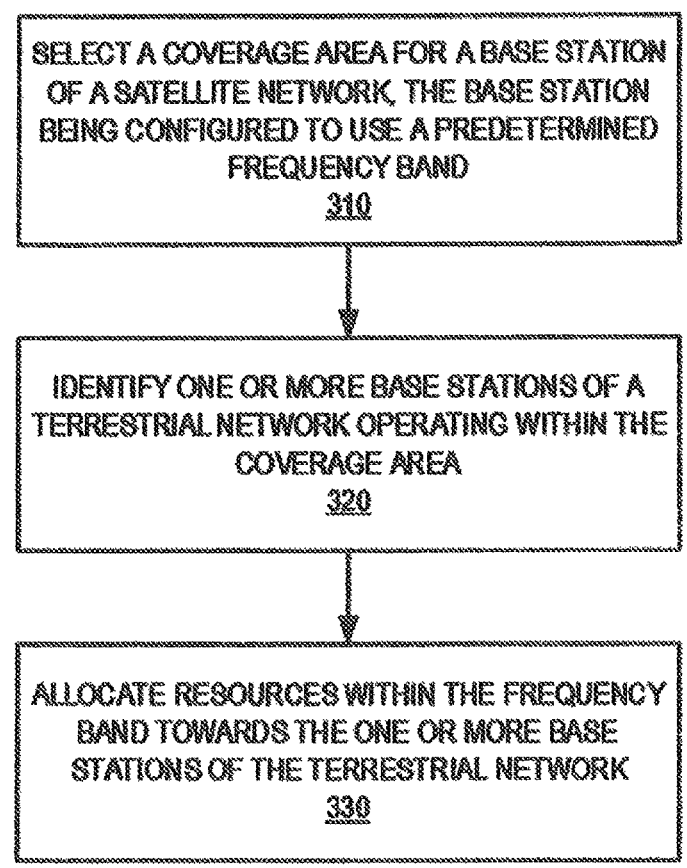
FIG. 3 is a flowchart of a process for sharing resources of a frequency band with multiple wireless networks.

FIG. 3 is a flowchart of a process for sharing resources of a frequency band with multiple wireless networks, in accordance with one or more embodiments. Although FIG. 3 depicts steps performed in a particular order for purposes of illustration and discussion, the operations discussed herein are not limited to any particular order or arrangement. One skilled in the art, using the disclosures provided herein, will appreciate that various steps of the process can be omitted, rearranged, combined, and/or adapted in various ways.

At 310, a geographical coverage area (or beam) served by a satellite network and base station associated therewith is selected (or identified). According to one or more embodiments, the base station is configured to utilize a predetermined frequency spectrum to communicate with satellite terminals within the geographical coverage area (or beam). The frequency spectrum used within the selected coverage area, can be a portion of the total allocated frequency for the satellite network while adjacent geographical coverage areas utilize different portions of the total allocated frequency.

At 320, one or more base station of a terrestrial network are identified as operating within the selected geographical coverage area of the satellite network determined in 310. For example, one or more terrestrial base stations of a terrestrial network (such as a NodeB, eNB, gNB, femtocell, etc.) may be configured to operate within the selected geographical coverage area utilizing the same frequency spectrum. The one or more terrestrial base stations may be identified as "operating" within the geographical coverage area of the terrestrial network based on one or more of a geographical location of the terrestrial base stations or a coverage area of a radio air interface deployed therefrom. For example, an overlapping region between a satellite coverage area and a terrestrial coverage area may be considered in identifying the one or more terrestrial base stations.

At 330, resources within the frequency spectrum are allocated towards the one or more base stations of the terrestrial network. The resources within a frequency spectrum may comprise resource blocks of frequencies and/or time durations that are available on which wireless signals can be transmitted. For example, in a time division duplexing (TDD) network, the resource blocks may comprise time blocks of a specific frequency within the frequency spectrum. Alternatively or additionally, in a frequency division duplexing (FDD) network, the resource blocks may comprise frequency blocks available at a specific time slot. Thus, resource blocks may be allocated towards the one or more terrestrial base stations by a network node, such as a management entity, or a scheduler.

For example, a satellite base station (or its associated GRM) may instruct a scheduler of a terrestrial base station to utilize specific sets of resource blocks of a frequency spectrum, and reserve or allocate the remaining resources in the frequency spectrum for the satellite base station, such that both networks can operate seamlessly using the same frequencies. Various types and combinations of allocations of air-interface resources may be evident to those of ordinary skill in the art, in light of this disclosure. For example, resources allocated towards the terrestrial base stations can comprise a middle portion of the frequency spectrum, and the remaining resources allocated towards the satellite base station can comprise one or more edge portions of the frequency spectrum. According to an embodiment, the one or more edge portions of the frequency spectrum F1 comprise one or more guard bands. According to other embodiments, the amount of resources allocated towards each network (i.e., terrestrial or satellite) may be based on a geographical location of the terrestrial base station within the selected geographical coverage area, a size of an overlap region, interference reported within the selected geographical coverage area and/or an overlap region, and/or a usage requirement of each network base station.

Figure 4A:
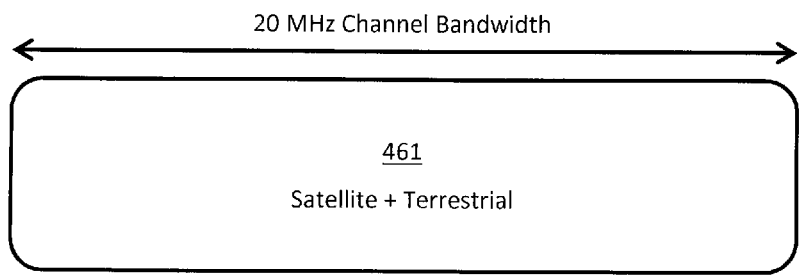
FIGS. 4A-4C are diagrams for illustrating various allocations of resources of a frequency band shared with multiple wireless networks.
Figure 4B:
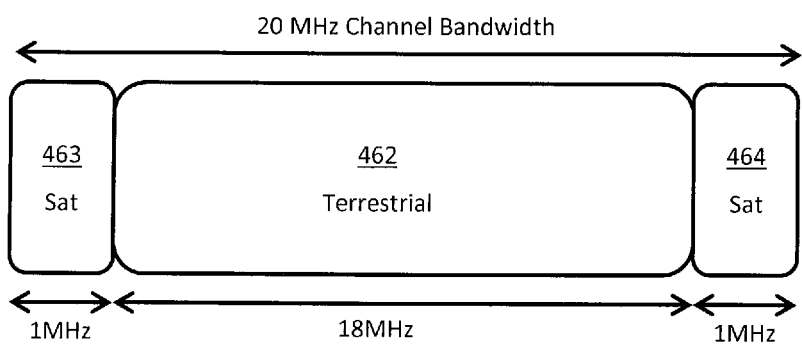
Figure 4C:
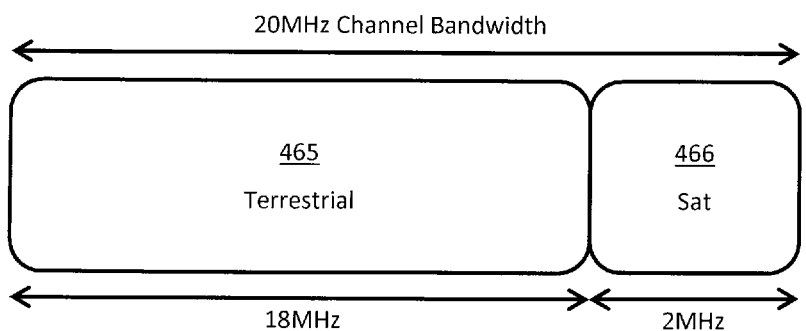

FIGS. 4A-4C are diagrams for illustrating various allocations of resources of a frequency spectrum shared with multiple networks, according to at least one embodiment. An exemplary frequency spectrum may comprise a radiofrequency (RF) channel with a bandwidth of 20 MHz. With reference to FIG. 4A, an entire portion 461 of the 20 MHz channel can be allocated towards both satellite and terrestrial base stations. As illustrated in FIG. 4B, the 20 MHz bandwidth may be divided into a center portion 462 allocated towards terrestrial network transmissions and two edge portions 463 and 464 allocated towards satellite network transmissions. In an exemplary implementation, the 20 MHz channel bandwidth comprises an 18 MHz center portion that is occupied by 100 Resource Blocks (180 KHz per Resource Block), and 1 MHz edge portions 463, 464 that are typically allocated as guard bands. Thus, the bandwidth typically allocated for these guard bands 463, 464 can be allocated towards satellite transmissions. According to one implementation, the satellite can be configured to allocate different beam formers allocated for random access channel (RACH) and traffic carriers. For example, consider a system which requires one random access channel (RACH) and one GMR-1 traffic carrier as a minimum for a return link in each beam. With a total of 62.5 kHz per beam and with a frequency reuse factor of 12, a total bandwidth of 750 kHz would be required for minimum operation. Thus, the 1 MHz guard band is sufficient for satellite operation.

Depending on the specific beam selected for spectrum sharing, traffic carriers may be allocated based on demand and availability of spectrum. This can provide basis satellite service in the return link. The same concept can also be extended in the forward link in those beams that cause interference to terrestrial users from the satellite. In addition, more spectrum efficiency can be achieved by using even smaller reuse factor for RACH. For example, if a reuse factor of 4 is used for RACH and 12 for traffic for the satellite service in the return link, a total bandwidth of less than 500 kHz is needed for minimum operation. This can be achieved with different beam formers allocated for traffic and RACH carriers in the satellite communication system.

With reference to FIG. 4C, the 18 MHz terrestrial portion is shifted from the center towards one side of the 20 MHz spectrum, and a single contiguous 2 MHz edge portion 466 is provided on the other side. According to such an embodiment, the satellite can be configured with a beam former capable of supporting the 2 MHz channel, which may simplify satellite design and reduce production and deployment costs. However, a combination of allocations illustrated in FIGS. 4A-C can be made available to a network operator based on the needs of the communication network. For example, satellite networks that serve rural areas or geographical areas with limited terrestrial service may be allocated with center portions or the entire bandwidth as illustrated in FIG. 4A. When the geographical density of terrestrial base stations increases, for example in urban areas, various portions of the spectrum, such as the edge portions in FIG. 4B or the combined portions in FIG. 4C may be deployed. Such a dynamic configuration enables coexistence of signals from both networks without relying on inefficient methods such as beam nulling or interference coordination.

Figure 5:
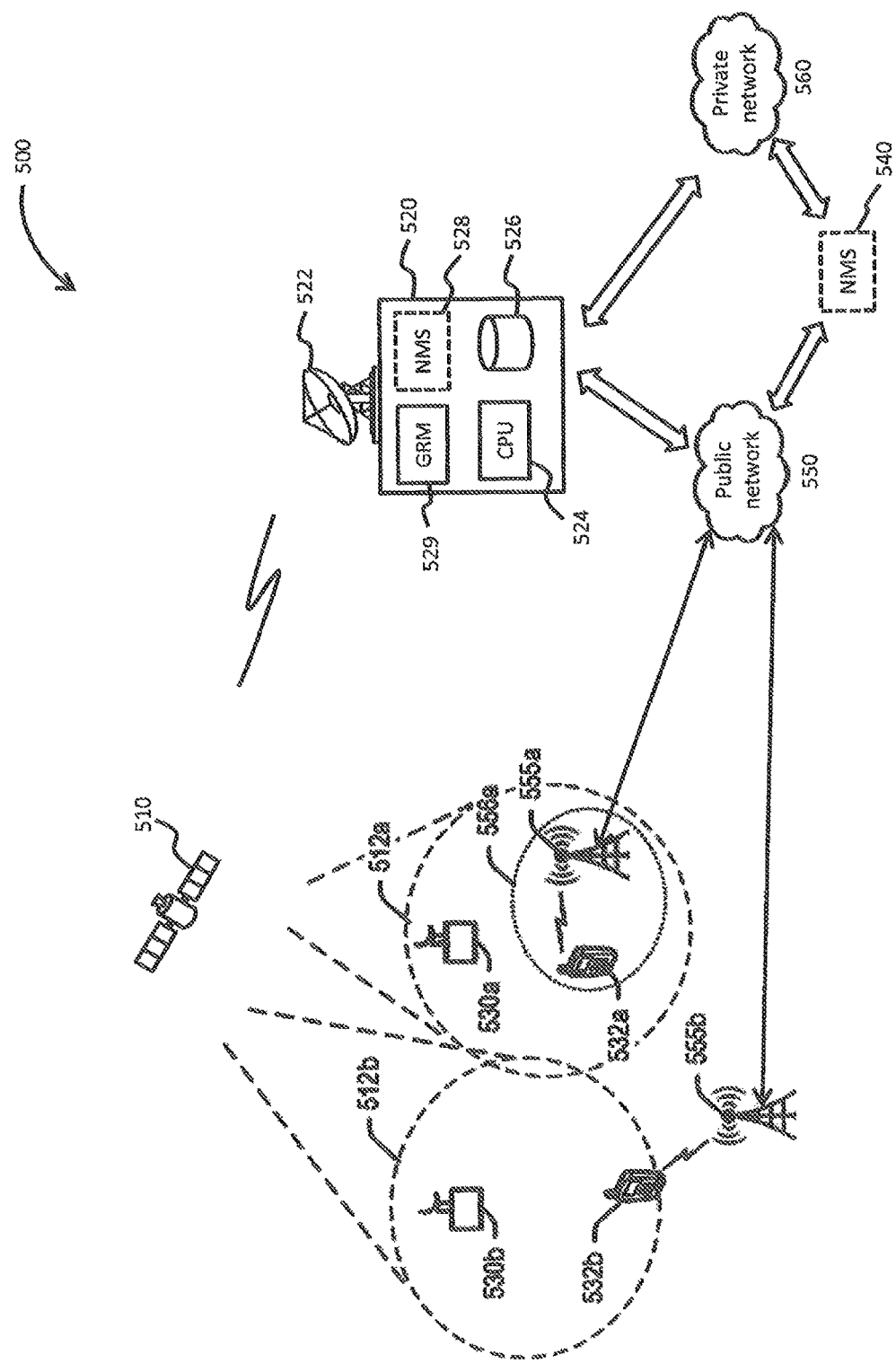
FIG. 5 is a diagram of a satellite communication system capable of sharing resources of a frequency band with multiple wireless networks based on a location of base stations and overlapping coverage areas.

FIG. 5 is a diagram of a satellite communication system capable of sharing resources of a frequency band with multiple wireless networks based on a location of terrestrial base stations and overlapping coverage areas. The system 500 includes a satellite 510 and a satellite base station 520 which facilitate communication between terminals 530a and 530b and various networks such as a public network 550, and a private network 560. According to the illustrated embodiment, two beams are shown, namely beam 512a and beam 512b. The system 500 further includes terrestrial base stations 555a and 555b, which are associated with a terrestrial network and which respectively facilitate communication between terminal 532a and 532b and public network 550 via radio air interfaces deployed over coverage areas 556a and 556b. Further, satellite 510 and both terrestrial base stations 555a and 555b are capable of utilizing a common frequency band, or spectrum. The satellite base station 520 can include, in part, a transceiver 522 which transmits/receives information to/from the satellite 510, a processing unit 524 (or computer, CPU, etc.), a data storage unit 526, a network management system (NMS) 528, and a global resource manager (GRM) 529. According to at least one embodiment, an external NMS 540 can be provided in place of, or in addition to NMS 528.

The satellite base station 520 can be configured to select the geographical coverage areas of beams 512a and 512b served by satellite 510 and identifying the terrestrial base stations 555a and 555b as operating within the geographical coverage areas 512a, 512b prior to allocating the resources. Further, the terrestrial base stations 555a and 55b operating within coverage areas 512a, 512b can be based on a geographical location of a terrestrial base station being within a geographical coverage area served by the satellite network (such as terrestrial base station 555a operating within coverage area 512a), and/or determining an overlap region between the geographical coverage area of the satellite network and a second geographical coverage area served by the terrestrial base station (such as geographical coverage areas 556b and 512b). Consequently, an amount of the resources allocated towards each base station may be based on a geographical location of the terrestrial base stations or a size of the overlap region. Further, in an exemplary embodiment, the amount of the resources can be allocated towards terrestrial base stations 555a, 555b based on an interference caused therefrom and reported within geographical coverage areas 512a, 512b, 556a, 556b, and overlap regions thereof. For example, if wireless terminal 532b were to be served by satellite base station 520, an interference may be caused by the location of wireless terminal 532b in an overlap region of geographical coverage areas 512b and 556b. Thus, the allocation of resources may be based or adjusted on the interference.

Figure 6:
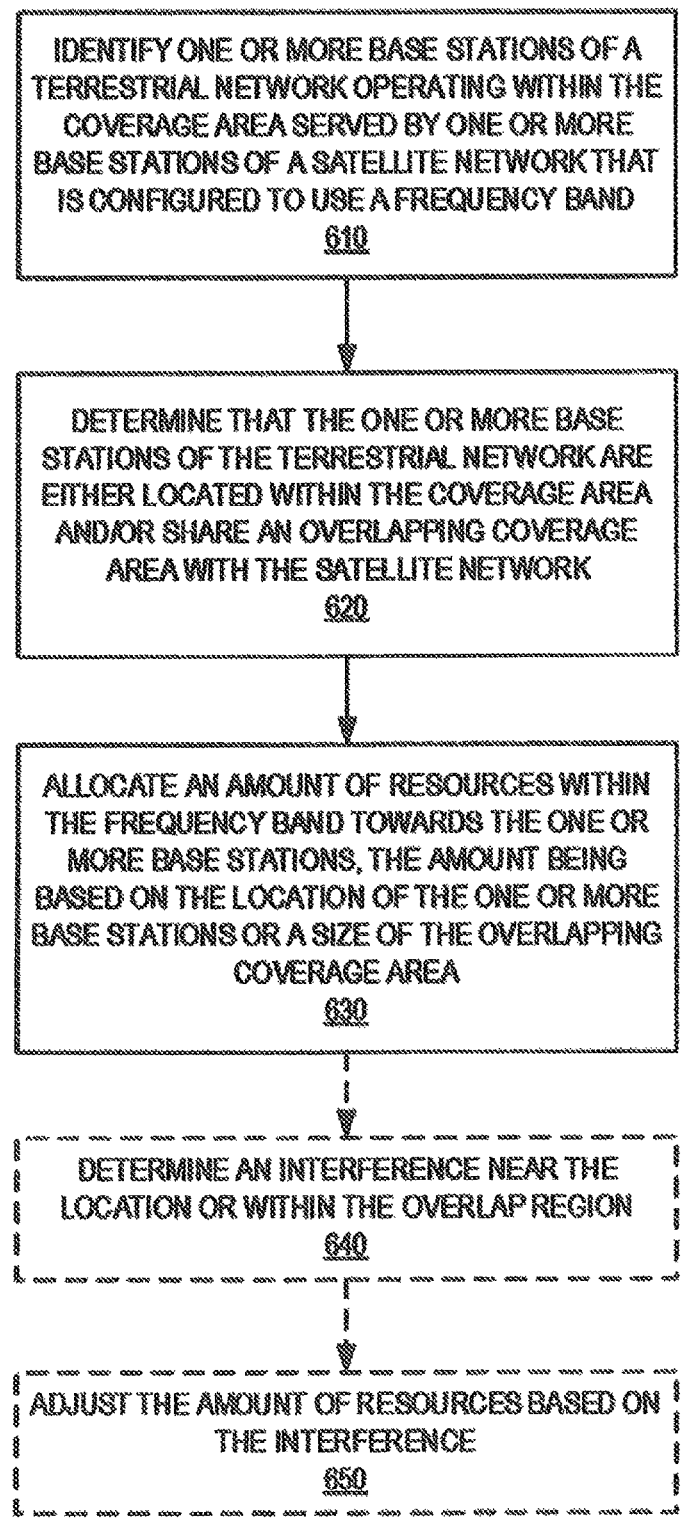
FIG. 6 is a flowchart of a process for sharing resources of a frequency band with multiple wireless networks based on a location of base stations and overlapping coverage areas.

FIG. 6 is a flowchart of a process for sharing resources of a frequency band with multiple wireless networks based on a location of base stations and overlapping coverage areas. Although FIG. 6 depicts steps performed in a particular order for purposes of illustration and discussion, the operations discussed herein are not limited to any particular order or arrangement. One skilled in the art, using the disclosures provided herein, will appreciate that various steps of the process can be omitted, rearranged, combined, and/or adapted in various ways.

At 610, a geographical coverage area served by a satellite network and a satellite base station associated therewith is selected. The satellite base station can be configured to utilize a predetermined frequency band (or spectrum), for example, to establish communication with various satellite terminals via the satellite At 620, one or more base station of a terrestrial network are identified as operating within the geographical coverage area of the satellite network determined in 610. For example, one or more terrestrial base stations of a terrestrial network (such as a NodeB, eNB, gNB, femtocell, etc.) may be configured to operate within the one or more geographical coverage areas utilizing the same frequency spectrum. The one or more terrestrial base stations may be identified as "operating" within the geographical coverage area of the terrestrial network based on one or more of a geographical location of the terrestrial base stations or a coverage area of a radio air interface deployed therefrom. For example, an overlapping region between a satellite coverage area and a terrestrial coverage area may be considered in identifying the one or more terrestrial base stations.

At 630, resources within the frequency spectrum are allocated towards the one or more base stations of the terrestrial network based on the location and/or the coverage area overlap. The resources within a frequency spectrum may comprise resource blocks of frequencies and/or time durations that are available on which to transmit wireless signals. For example, in a time division duplexing (TDD) network, the resource blocks may comprise time blocks of a specific frequency within the frequency spectrum. Alternatively or in addition, in a frequency division duplexing (FDD) network, the resource blocks may comprise frequency blocks available at a specific time slot. Thus, resource blocks may be allocated towards the one or more terrestrial base stations by a network node, such as a management entity, or a scheduler. For example, a GRM may instruct a scheduler of a terrestrial base station to utilize specific sets of resource blocks of a frequency spectrum, and reserve or allocate the remaining resources in the frequency spectrum for the satellite base station, such that both networks can operate using the same frequencies without causing interference to each others' signals. Various types and combinations of allocations of air-interface resources may be evident to those of ordinary skill in the art, in light of this disclosure. For example, resources allocated towards the terrestrial base stations can comprise a middle portion of the frequency spectrum, and the remaining resources allocated towards the satellite base stations can comprise one or more edge portions of the frequency spectrum such as, for example, a guard band. Further, an amount of the resources allocated towards each base station may be based on a geographical location of the terrestrial base station within the geographical coverage area of the one or more satellite base stations, a size of an overlap region, an interference reported within the satellite geographical coverage area and/or an overlap region, and/or a usage requirement of each base station.

Thus, optionally at 640 and 650, the amount of the resources can be allocated towards the terrestrial base stations based on an interference caused therefrom and reported within geographical coverage areas of the satellite network and overlap regions thereof. For example, if a wireless terminal were to be served by a satellite base station, the wireless terminal may report an interference caused by its location within an overlap region of a geographical coverage area of the satellite network and a terrestrial network. Thus, at 650, the amount of resources allocated towards each base station may be adjusted based on the reported interference.

Figure 7A:
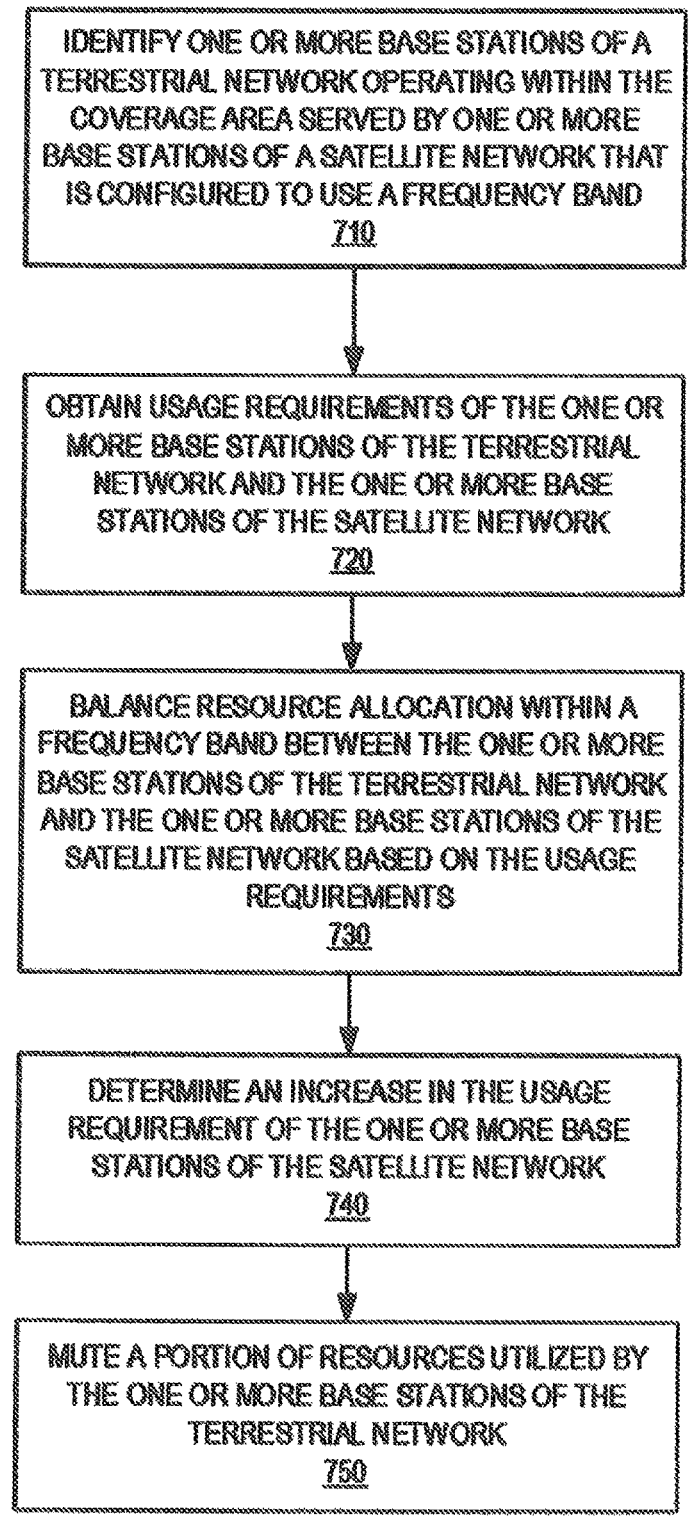
FIG. 7A is a flowchart of a process for sharing resources of a frequency band with multiple wireless networks based on a usage requirement.

FIG. 7A is a flowchart of a process for sharing resources of a frequency band with multiple wireless networks based on a usage requirement. Although FIG. 7 depicts steps performed in a particular order for purposes of illustration and discussion, the operations discussed herein are not limited to any particular order or arrangement. One skilled in the art, using the disclosures provided herein, will appreciate that various steps of the process can be omitted, rearranged, combined, and/or adapted in various ways.

At 710, one or more base station of a terrestrial network are identified as operating within the geographical coverage area of a satellite communication network. For example, a satellite communication network may include a satellite base station in wireless communication with a satellite which deploys a wireless air interface utilizing a specified frequency spectrum over one or more geographical coverage areas. One or more terrestrial base stations of a terrestrial network (such as a NodeB, eNB, gNB, femtocell, etc.) may be identified as operating within the one or more geographical coverage areas and capable of utilizing the same frequency spectrum. The one or more terrestrial base stations may be identified as "operating" within the geographical coverage area of the satellite network based on one or more of a geographical location of the terrestrial base stations or a coverage area of a radio air interface deployed therefrom. For example, an overlapping region between a satellite coverage area and a terrestrial coverage area may be considered in identifying the one or more terrestrial base stations.

At 720, a usage requirement of the one or more base stations of either or both networks may be obtained by, for example, querying a network server, or reported periodically by each base station to a GRM in communication with the base stations of each communication network, as described above. The usage requirement of each base station can be based on a usage of one or more wireless terminals attached thereto. Subsequently at 730, a resource allocation of resources within the frequency band is balanced between the satellite network and the terrestrial network based on the usage requirements. The resources within a frequency spectrum may comprise resource blocks of frequencies and/or time durations that are available on which to transmit wireless signals. For example, in a time division duplexing (TDD) network, the resource blocks may comprise time blocks of a specific frequency within the frequency spectrum. Alternatively or in addition, in a frequency division duplexing (FDD) network, the resource blocks may comprise frequency blocks available at a specific time slot. Thus, resource blocks may be allocated towards the one or more base stations by a network node, such as a management entity, or a scheduler. For example, the GRM may instruct a scheduler of a terrestrial base station to utilize specific sets of resource blocks of a frequency spectrum, and reserve or allocate the remaining resources in the frequency spectrum for the satellite base station, such that the base stations of each type of communication network can operate using the same frequencies without causing interference to each others' signals. For example, resources allocated towards the terrestrial base stations can comprise a middle portion of the frequency spectrum, and the remaining resources allocated towards the satellite base stations can comprise one or more edge portions of the frequency spectrum such as, for example, a guard band. Further, if at 740, a usage requirement of wireless terminals attached to the satellite network is high, or meets a threshold, then at 750, the terrestrial base station may be instructed to mute a portion of the resources allocated thereto.

Figure 7B:
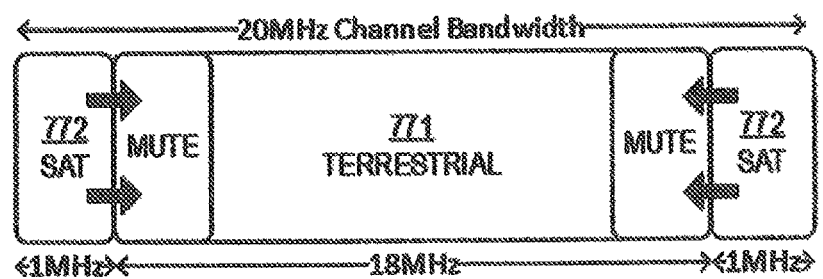
FIG. 7B is a diagram for illustrating allocations of resources of a frequency band based on a usage requirement.

FIG. 7B is a diagram for illustrating allocations of resources of a frequency band based on a usage requirement. With reference to FIG. 7B, a 20 MHz bandwidth may be divided into a center portion 771 allocated towards terrestrial network transmissions and two edge portions 772 allocated towards satellite network transmissions. In this exemplary embodiment, as the usage requirement of a satellite network increases within the beam selected for spectrum sharing, the terrestrial base station (utilizing resources 771) is instructed to mute a portion of its resources, such that the satellite network can use frequencies in the muted portions without being subject to interference caused by terrestrial network transmissions. As described above, 750 kHz of total bandwidth may be required for minimum operation of a satellite network (assuming one RACH, one 1× in the return link of each beam, 62.5 kHz per beam, and a reuse of 12). However, more bandwidth may be needed for 2× or a 5× carriers to be deployed. Muting the terrestrial network in such instances can provide this additional bandwidth. For example, muting a number of resource blocks adjacent to the guard band can enable utilization of extra bandwidth for the satellite network. In an exemplary embodiment, 5 resource blocks from each side of terrestrial bandwidth 771 may be muted for terrestrial transmissions and utilized to expand the satellite bandwidths 772 by an additional 900 KHz each.

Figure 8A:
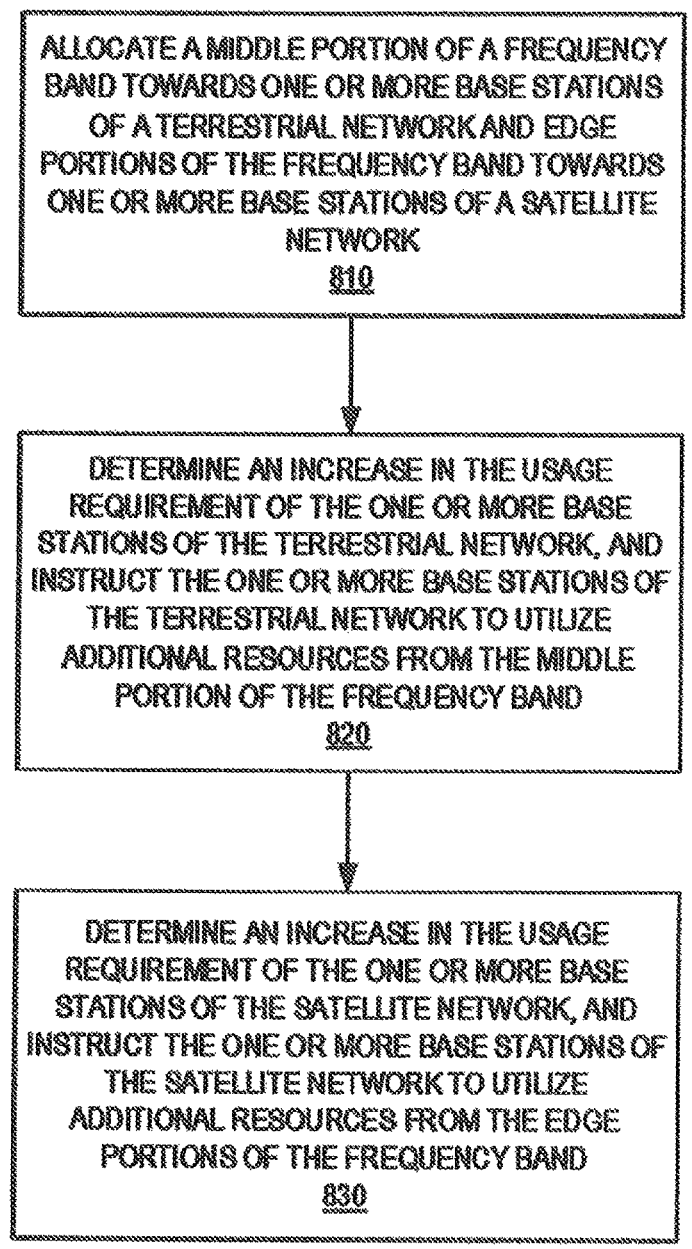
FIG. 8A is a flowchart of a process for adjusting allocations of resources of a frequency band based on changes in a usage requirement.

FIG. 8A is a flowchart of a process for adjusting allocations of resources of a frequency band based on changes in a usage requirement. Although FIG. 8 depicts steps performed in a particular order for purposes of illustration and discussion, the operations discussed herein are not limited to any particular order or arrangement. One skilled in the art, using the disclosures provided herein, will appreciate that various steps of the process can be omitted, rearranged, combined, and/or adapted in various ways.

At 810, resources in a frequency spectrum are shared between a satellite network and one or more base stations of a terrestrial network, as described herein. For example, the resources allocated towards a terrestrial base station can comprise a middle portion of the frequency spectrum, and the remaining resources allocated towards a satellite base station can comprise one or more edge portions of the frequency spectrum, such as guard bands. Further, at 820, an increase may be determined in the usage requirement of the satellite base station, at which time it may be instructed to increase its resource utilization starting from the edge portions of the frequency band. Similarly, at 830, an increase may be determined in the usage requirement of the one or more terrestrial base stations, and the one or more terrestrial base stations instructed to increase their resource utilization starting from the center of the frequency band.

Figure 8B:
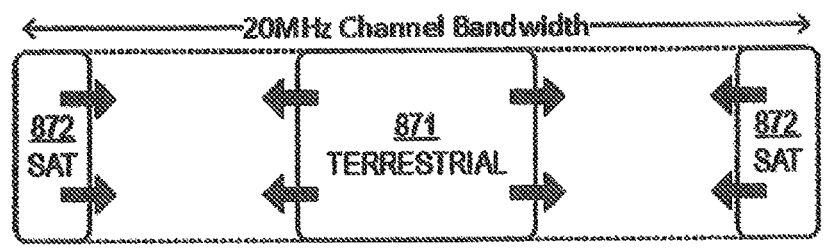
FIG. 8B is a diagram for illustrating adjustment allocations of resources of a frequency band based on changes in a usage requirement.

Such exemplary adjustment allocations of resources of a frequency band based on changes in a usage requirement are illustrated in FIG. 8B. For example, a 20 MHz channel bandwidth may be divided into a center portion 871 allocated towards terrestrial network transmissions and two edge portions 872 allocated towards satellite network transmissions. In this exemplary embodiment, as the usage requirement of the satellite network (or base stations thereof) increases, the satellite base stations are instructed to utilize additional resources in a direction away from the edge portions 872 and towards center portion 871. Further as the usage requirement of the terrestrial network (or base stations thereof) increases, the terrestrial base stations are instructed to utilize additional resources in a direction away from the center portion 871 in a direction towards the edge portions 872. Thus, a frequency separation is maintained between the two types of networks, thereby minimizing any potential interference.

Further, in an exemplary embodiment wherein the aforementioned methods are incorporated within a TDD system, most of the interference to the satellite system in the return direction may be caused by terrestrial base stations, since the transmission power from the base stations are much higher than that from the terrestrial terminal devices. Thus, the NMS of the satellite system can be configured to schedule (or to instruct the satellite base stations to schedule) each satellite terminal device to transmit at the time instance when the terrestrial terminal devices transmit. In this way, the interference from the terrestrial base stations to the satellite system is minimized in the return direction.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described base station, NMS, GRM, base station, receivers, transmitters, transceivers, satellite terminals, mobile handsets, etc. Additionally, such hardware can be interfaced to connect and/or facilitate communication between different components NMS and the GRM in order share frequency spectrum between the different networks.

The terms software, computer software computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc.

As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for performing the described functions is detailed below.

FIG. 9 is a diagram of a computer system that can be used to implement various embodiments. The computer system 900 includes a bus 901 or other communication mechanism for communicating information and a processor 903 coupled to the bus 901 for processing information. The computer system 900 also includes main memory 905, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a user. An input device 913, such as a keyboard including alpha-numeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 10 illustrates a chip set 1000 upon which an embodiment of the invention may be implemented. Chip set 1000 is programmed to implement various features as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    selecting a first geographical coverage area served by a first base station associated with a first network, wherein the first base station is configured to utilize a predetermined frequency spectrum, the predetermined frequency spectrum being a contiguous set of frequencies owned by the first network;
    identifying a second base station operating within the first geographical coverage area, the second base station being associated with a second network;
    allocating a contiguous portion of the predetermined frequency spectrum and resources associated therewith for exclusive use by the second base station;
    allocating a remaining portion of the predetermined frequency spectrum adjacent to the contiguous portion and resources associated therewith towards the first base station;
    determining, by the first base station, usage requirements of the first base station and the second base station; and
    dynamically adjusting the contiguous portion of the predetermined frequency spectrum and the remaining portion of the predetermined frequency spectrum based, at least in part, on the determined usage requirements,
    wherein a frequency separation is maintained between the first network and the second network,
    wherein the contiguous portion of the predetermined frequency spectrum allocated towards the second base station comprises a middle portion of the predetermined frequency spectrum, and the remaining portion of the predetermined frequency spectrum allocated towards the first base station comprises one or more edge portions of the predetermined frequency spectrum,
    wherein the one or more edge portions of the predetermined frequency spectrum comprise one or more guard bands, and
    wherein the first network comprises a satellite network, and the second network comprises a terrestrial network.

2. The method of claim 1, wherein identifying the second base station comprises one or both of:
    determining that a geographical location of the second base station is within the first geographical coverage area, or
    determining an overlap region between the first geographical coverage area and a second geographical coverage area served by the second base station.

3. The method of claim 2, wherein the contiguous portion of the predetermined frequency spectrum is allocated towards the second base station based on the geographical location, a size of the overlap region, or both.

4. The method of claim 2, wherein the contiguous portion of the predetermined frequency spectrum is allocated towards the second base station based on an interference reported within the overlap region.

5. The method of claim 1, wherein the usage requirement of each base station is based on a usage of one or more terminals linked to each base station.

6. The method of claim 1, further comprising:
    determining an increase in the usage requirement of the first base station; and
    instructing the second base station to mute a portion of its allocated resources based on the increase.

7. A system comprising:
    a first base station associated with a first network and configured to utilize a predetermined frequency spectrum, the predetermined frequency spectrum being a contiguous set of frequencies owned by the first network; and
    one or more processors coupled to the first base station, the one or more processors being configured to:
        select a first geographical coverage area served by the first base station;
        identify a second base station operating within the first geographical coverage area, the second base station being associated with a second network;
        allocate a contiguous portion of the predetermined frequency spectrum and resources associated therewith for exclusive use by the second base station,
        allocate a remaining portion of the predetermined frequency spectrum adjacent to the contiguous portion and resources associated therewith towards the first base station;
        determine usage requirements of the first base station and the second base station; and
        dynamically adjust the contiguous portion of the predetermined frequency spectrum and the remaining portion of the predetermined frequency spectrum based, at least in part, on the determined usage requirements,
    wherein a frequency separation is maintained between the first network and the second network,
    wherein the contiguous portion of the predetermined frequency spectrum allocated towards the second base station comprises a middle portion of the predetermined frequency spectrum, and the remaining portion of the predetermined frequency spectrum allocated towards the first base station comprises one or more edge portions of the predetermined frequency spectrum,
    wherein the one or more edge portions of the predetermined frequency spectrum comprise one or more guard bands, and
    wherein the first network comprises a satellite network, and the second network comprises a terrestrial network.

8. The system of claim 7, wherein the one or more processors are configured to identify the second base station based on one or both of:
    determining that a geographical location of the second base station is within the first geographical coverage area, or
    determining an overlap region between the first geographical coverage area and a second geographical coverage area served by the second base station.

9. The system of claim 8, wherein the one or more processors are further configured to allocate the contiguous portion of the predetermined frequency spectrum towards the second base station based on one or more of: the geographical location, a size of the overlap region, and an interference reported within the overlap region.

10. The system of claim 9, wherein the one or more processors are further configured to:
    determine an increase in the usage requirement of the first base station; and
    instruct the second base station to mute a portion of the resources allocated towards the second base station based on the increase.

11. The system of claim 7, wherein the one or more processors are further configured to instruct the first base station to utilize a reduced frequency reuse factor instead of a default frequency reuse factor.

12. The system of claim 11, wherein the one or more processors are further configured to instruct the first base station to:
    utilize the reduced frequency reuse factor for a random access channel; and
    utilize the default frequency reuse factor for a data channel.

13. The method of claim 1, wherein the contiguous portion of the predetermined frequency spectrum is allocated towards the second base station based on at least one of pre-configured priority requirements or quality of service requirements.

14. The method of claim 1, further comprising:
    allocating a buffer region between the middle portion of the predetermined frequency spectrum and each edge portion of the predetermined frequency spectrum,
    wherein the buffer region is used for dynamically adjusting the contiguous portion of the predetermined frequency spectrum and the remaining portion of the predetermined frequency spectrum.

15. The method of claim 14, wherein additional resources for the first base station are allocated in a direction away from the one or more edge portions into the buffer region and towards the middle portion of the predetermined frequency spectrum.

16. The method of claim 14, wherein additional resources for the second base station are allocated in a direction away from the middle portion into the buffer region and towards the one or more edge portions of the predetermined frequency spectrum.

17. The method of claim 1, wherein the first base station is configured to utilize a reduced frequency reuse factor instead of a default frequency reuse factor.

18. The method of claim 17, further comprising:
    utilizing the reduced frequency reuse factor for a random access channel; and
    utilizing the default frequency reuse factor for a data channel.

19. The system of claim 7, wherein the usage requirement of each base station is based on a usage of one or more terminals linked to each base station.

20. The system of claim 7, wherein the one or more processors are configured to allocate the contiguous portion of the predetermined frequency spectrum towards the second base station based on at least one of pre-configured priority requirements or quality of service requirements.

21. The system of claim 7, wherein the one or more processors are further configured to:
   allocate a buffer region between the middle portion of the predetermined frequency spectrum and each edge portion of the predetermined frequency spectrum,
   wherein the buffer region is used for dynamically adjusting the portion of the predetermined frequency spectrum and the remaining portion of the predetermined frequency spectrum.

22. The system of claim 21, wherein additional resources for the first base station are allocated in a direction away from the one or more edge portions into the buffer region and towards the middle portion of the predetermined frequency spectrum.

23. The system of claim 21, wherein additional resources for the second base station are allocated in a direction away from the middle portion into the buffer region and towards the one or more edge portions of the predetermined frequency spectrum.

* * * * *